(12) United States Patent
Allen et al.

(10) Patent No.: US 11,617,313 B2
(45) Date of Patent: **\*Apr. 4, 2023**

(54) CONTROLLING AGRICULTURAL PRODUCTION AREAS

(71) Applicant: THE YIELD TECHNOLOGY SOLUTIONS PTY LTD, Surry Hills (AU)

(72) Inventors: Simon Allen, Tasmania (AU); Peter Love, Tasmania (AU); Nicolene Abrie, Tasmania (AU); Elizabeth Graham, Tasmania (AU)

(73) Assignee: THE YIELD TECHNOLOGY SOLUTIONS PTY LTD, Surry Hills (AU)

( \* ) Notice: Subject to any disclaimer, the term of this patent is extended or adjusted under 35 U.S.C. 154(b) by 354 days.

This patent is subject to a terminal disclaimer.

(21) Appl. No.: 17/008,431

(22) Filed: Aug. 31, 2020

(65) Prior Publication Data

US 2020/0390044 A1 Dec. 17, 2020

Related U.S. Application Data

(63) Continuation of application No. 16/346,476, filed as application No. PCT/AU2017/051194 on Oct. 30, 2017, now Pat. No. 10,798,891.

(30) Foreign Application Priority Data

Nov. 2, 2016 (AU) .................................. 2016904465
Oct. 9, 2017 (AU) .................................. 2017245290

(51) Int. Cl.
*A01G 25/16* (2006.01)
*A01G 25/02* (2006.01)
(Continued)

(52) U.S. Cl.
CPC .......... *A01G 25/167* (2013.01); *A01G 25/02* (2013.01); *A01G 27/003* (2013.01); *G01W 1/10* (2013.01)

(58) Field of Classification Search
CPC ....... A01G 25/02; A01G 27/003; G01W 1/10; G06Q 10/04; G06Q 50/02; Y02A 40/10
See application file for complete search history.

(56) References Cited

U.S. PATENT DOCUMENTS 5,870,302 A \* 2/1999 Oliver .................. A01G 25/167
239/69
9,952,352 B2 \* 4/2018 Kirby ...................... H04W 4/02
(Continued)

FOREIGN PATENT DOCUMENTS

CN 108474868 A \* 8/2018 .............. G01W 1/08
WO WO 2016/164147 A1 10/2016

OTHER PUBLICATIONS

Extended European Search Report dated Apr. 15, 2020 for corresponding European Application No. 17867562.5 (10 pages).

*Primary Examiner* — Vincent H Tran
(74) *Attorney, Agent, or Firm* — Lewis Roca Rothgerber Christie LLP

(57) ABSTRACT

An irrigation system for an area receives wide-area meteorological prediction data and sensors deployed within the area collect local-area sensor data. A processor stores received data as historical wide-area meteorological prediction data and data from the sensors as historical local-area sensor data. The processor determines a relationship between the historical wide-area meteorological prediction data and the historical local-area sensor data based on the historical wide-area meteorological prediction data and the historical local-area sensor data, and calculates a prediction on a local-area parameter for a future point in time based on (Continued)

current wide-area meteorological prediction data, and the calculated relationship. The area is then controlled based on the prediction.

17 Claims, 8 Drawing Sheets

(51) Int. Cl.
  *A01G 27/00* (2006.01)
  *G01W 1/10* (2006.01)

(56) References Cited

U.S. PATENT DOCUMENTS

| | | | | |
|---|---|---|---|---|
| 10,798,891 | B2* | 10/2020 | Allen | A01G 25/02 |
| 2008/0288116 | A1* | 11/2008 | Nickerson | A01G 25/16 |
| | | | | 700/284 |
| 2012/0253259 | A1 | 10/2012 | Carlson et al. | |
| 2013/0099022 | A9 | 4/2013 | Palmer et al. | |
| 2014/0324351 | A1 | 10/2014 | Dannevik et al. | |
| 2014/0358486 | A1 | 12/2014 | Osborne | |
| 2015/0193713 | A1 | 7/2015 | Giunta et al. | |
| 2015/0230417 | A1* | 8/2015 | Nickerson | A01G 25/16 |
| | | | | 700/284 |
| 2016/0003790 | A1 | 1/2016 | Osborne et al. | |
| 2016/0057949 | A1 | 3/2016 | Williams et al. | |
| 2016/0116640 | A1 | 4/2016 | Phillips et al. | |
| 2016/0183483 | A1* | 6/2016 | Motohari Sharif | A01G 25/165 |
| | | | | 700/284 |
| 2016/0232621 | A1 | 8/2016 | Ethington et al. | |
| 2017/0061299 | A1 | 3/2017 | Mewes et al. | |
| 2017/0132537 | A1 | 5/2017 | Chavez | |
| 2018/0181893 | A1 | 6/2018 | Basso | |

* cited by examiner

1100

| Predicted:<br>Measured: | Wind | Temperature | Rain |
|---|---|---|---|
| Temperature | 0.01 | 0.59 | 0.34 |
| Relative Humidity | 0.72 | 0.87 | 0.76 |
| Wind | 0.24 | 0.10 | 0.55 |
| Rain | 0.75 | 0.45 | 0.56 |
| Leaf Wetness | 0.87 | 0.72 | 0.21 |
| Solar irradiation | 0.58 | 0.51 | 0.88 |
| Photosynthetic Active Radiation | 0.98 | 0.54 | 0.76 |
| Frost | 0.23 | 0.59 | 0.85 |
| Soil Moisture | 0.89 | 0.54 | 0.53 |
| Soil Temperature | 0.93 | 0.91 | 0.56 |

Fig. 11

CONTROLLING AGRICULTURAL PRODUCTION AREAS

CROSS-REFERENCE TO RELATED APPLICATIONS

The application is a continuation of U.S. application Ser. No. 16/346,476, having a 35 USC § 371(c) date of Apr. 30, 2019, which is a 35 USC § 371 National Stage Entry of PCT Application PCT/AU2017/051194, filed on Oct. 30, 2017, which claims priority of Australian Provisional Patent Application No 2016904465 filed on 2 Nov. 2016 and Australian Complete Patent Application No 2017245290 filed on 9 Oct. 2017, the entire contents of all of which are incorporated herein by reference.

TECHNICAL FIELD

This disclosure relates to systems and methods for controlling agricultural production areas.

BACKGROUND

Agricultural production is significantly affected by environmental influences. FIG. 1 illustrates an agricultural production 100 where crops 101 are grown on a slope of a hill 102. The sun 103 provides light for the crops 101 to grow but also causes evapotranspiration which is balanced by precipitation 104 from clouds 105. However, the precipitation 104 depends on whether cloud 105 passes hill 102 before reaching the area above the crops 101, which in turn depends on wind 106. In order to compensate for a lack of precipitation, a farmer can maintain a water reservoir 107 to irrigate the crops 101 when needed.

However, it is often difficult for the farmer to make the best decisions because the multitude of influences makes this decision complicated. Therefore, estimates are often inaccurate, which results in sub-optimal production. Therefore, there is a need for a more accurate prediction such that farmers can take action on their farms more efficiently.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

An irrigation system for an agricultural production area comprises:
an irrigation actuator;
a receiver for wide-area meteorological prediction data;
a sensor network comprising sensors deployed within the agricultural production area to collect local-area sensor data;
a processor configured to
store data from the receiver as historical wide-area meteorological prediction data;
store data from the sensor network as historical local-area sensor data;
determine a correlation between the historical wide-area meteorological prediction data and the historical local-area sensor data based on the historical wide-area meteorological prediction data and the historical local-area sensor data;
receive current wide-area meteorological prediction data from the receiver; and
calculate a prediction on water supply relative to water demand within the agricultural production area based on
the current wide-area meteorological prediction data, and
the correlation between the historical wide-area meteorological prediction data and the historical local-area sensor data, wherein the irrigation actuator is controlled based on the prediction on water supply relative to water demand to define an amount of water to be used for irrigating the agricultural production area.

A method for controlling an agricultural production area comprises:
determining a correlation between historical wide-area meteorological prediction data and historical local-area sensor data based on historical wide-area meteorological prediction data and historical local-area sensor data;
calculating a prediction on a local-area agricultural parameter based on
current wide-area meteorological prediction data, and
the correlation between the historical wide-area meteorological prediction data and the historical local-area sensor data; and
controlling the agricultural production area based on the prediction on the agricultural parameter.

It is an advantage that calculating a prediction based on local-area sensor data is more accurate as the calculation captures variations in the local area that are impossible to incorporate into wide-area forecasts. For example, a paddock that lies directly adjacent to a waterway has a significantly different microclimate, i.e. more humid depending on wind direction, than a paddock that is 50 m away from the waterway. Further, determining the correlation from the sensor data is more robust and cost efficient than modelling the characteristics of the local area. For example, it is difficult and error prone to model the wind across a given terrain. The determined correlation captures the effect that the wind has to the sensor data. As a result, a wide variety of micro-climatic effects can be captured without complicated and error prone modelling. This makes the method readily deployable to any terrain and any type of sensors and wide-area predictions.

Prediction may relate to at least 24 hours into the future.

The historical wide-area meteorological prediction data and the historical local-area sensor data may relate to at least 5 days in the past.

Calculating the prediction on the local-area agricultural parameter may be based on an agricultural model.

The agricultural model may be based on plant growth.

It is an advantage that considering plant growth makes the result more accurate than other models that only rely on soil types, for example, as plant growth can capture different types of plants on the same soil type.

The agricultural model may comprise a value indicative of evapotranspiration of plants.

The value indicative of evapotranspiration of plants may be variable over time.

It is an advantage that the calculations can adapt to the current state of plant growth and therefore 'track' the evapotranspiration as the plants grow.

Historical wide-area meteorological prediction data and the current wide-area meteorological prediction data may comprise wind data and determining the correlation and calculating the prediction is based on the wind data.

The method may further comprise repeatedly updating the correlation based on further wide-area meteorological prediction data and further local-area sensor data.

It is an advantage that the method learns over time and gets more accurate as more data becomes available.

The agricultural production area may comprise multiple sub-areas, there may be at least one local-area sensor in each of the multiple sub-areas, and determining the correlation and calculating the prediction may be performed for each of the sub-areas.

It is an advantage that different sub-areas can be controlled individually, which enables optimal utilisation across the entire area. This can capture changes of terrain, soil and other influencing factors across the different sub-areas.

Calculating a prediction on a local-area agricultural parameter may comprise calculating a prediction of a plant state and controlling the agricultural production area may be based on the plant state.

The method may further comprise calculating a prediction on future local-area sensor data, wherein controlling the agricultural production area may be based on the predicted plant state and the future local-area sensor data.

Controlling the agricultural production area comprises one or more of:
  plant;
  irrigate;
  harvest;
  protect; and
  feed.

The method may further comprise creating a graphical user interface to present the prediction on the local-area agricultural parameter to a user.

The method may comprise repeating the step of calculating the prediction for multiple future times and creating the graphical user interface to present a time series of the prediction for the multiple future times.

It is an advantage that the user can view the predictions over time and consider what actions to take. For example, the user may decide to stop irrigation despite a large current water deficit if one of the future predictions shows rainfall. In another example the user may need to plan staff utilisation over the next 7 days but if it is predicted to rain, only half the staff may be needed as they will not irrigate on that day, therefore the user will roster staff based on the future prediction of rainfall.

The graphical user interface may comprise input elements to allow the user to input planned controlling actions.

It is an advantage that the user can input controlling actions with reference to the predicted values which makes the interface more intuitive.

The method may further comprise determining a suggestion for controlling the agricultural production area based on the prediction on the agricultural parameter.

The method may further comprise determining a prediction on the local area sensor data based on the current wide-area meteorological prediction data and the correlation between the historical wide-area meteorological prediction data and the historical local-area sensor data, wherein determining the suggestion may be based on a predefined risk associated with local area sensor data where that risk is likely to occur and the suggestion is determined based on the prediction on the local area sensor data to reduce the risk.

The method may further comprise creating a user interface to display the suggestion.

The local-area agricultural parameter may be a water deficit or water surplus.

The prediction on the local-area agricultural parameter may comprise a quality parameter indicative of a predicted quality of a produce from the agricultural production area and controlling the agricultural production area may comprise optimising the quality parameter.

It is an advantage that the user can directly control the actual output that determines the profitability of the value chain. This avoids error prone and inaccurate guesswork and allows achieving the best quality result even when there is a large degree of variation in conditions across the farm.

The method may further comprise repeating the step of calculating the prediction on the quality parameter for multiple future times and creating a graphical user interface to present a time series of the prediction on the quality parameter for the multiple future times.

It is an advantage that the user can directly see at what times in the future the quality is optimal.

The quality parameter may comprise an expected shelf life.

Software, when executed by a computer, causes the computer to perform the above method.

A computer system for controlling an agricultural production area comprises:
  a receiver for wide-area meteorological prediction data and local area sensor data;
  a processor to
    determine a correlation between historical wide-area meteorological prediction data and historical local-area sensor data based on historical wide-area meteorological prediction data and historical local-area sensor data;
    calculate a prediction on a local-area agricultural parameter based on
      current wide-area meteorological prediction data, and
      the correlation between the historical wide-area meteorological prediction data and the historical local-area sensor data; and
  an output port to control the agricultural production area based on the prediction on the agricultural parameter.

Optional features described of any aspect of method, computer readable medium, computer system or irrigation system, where appropriate, similarly apply to the other aspects also described here.

Figure 2:
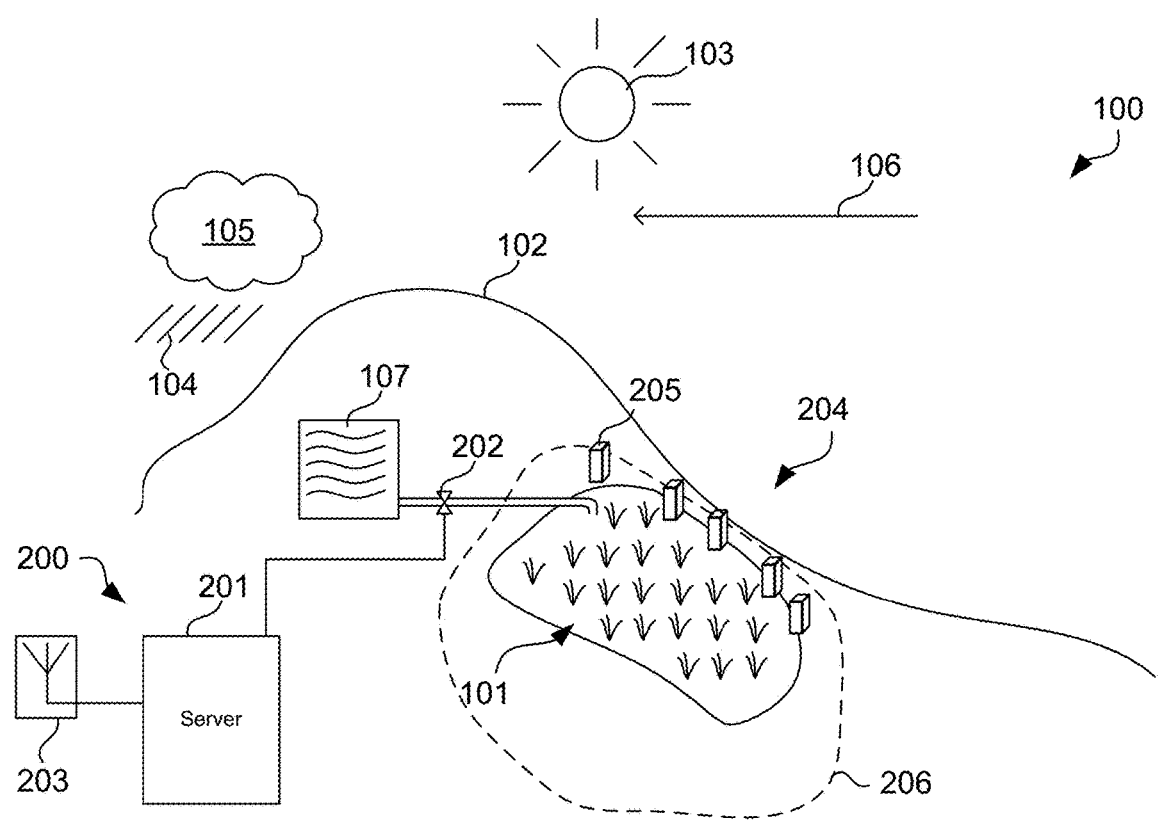

An example will now be described with reference to:

FIG. 2 illustrates a controlled agricultural production.

Figure 3:
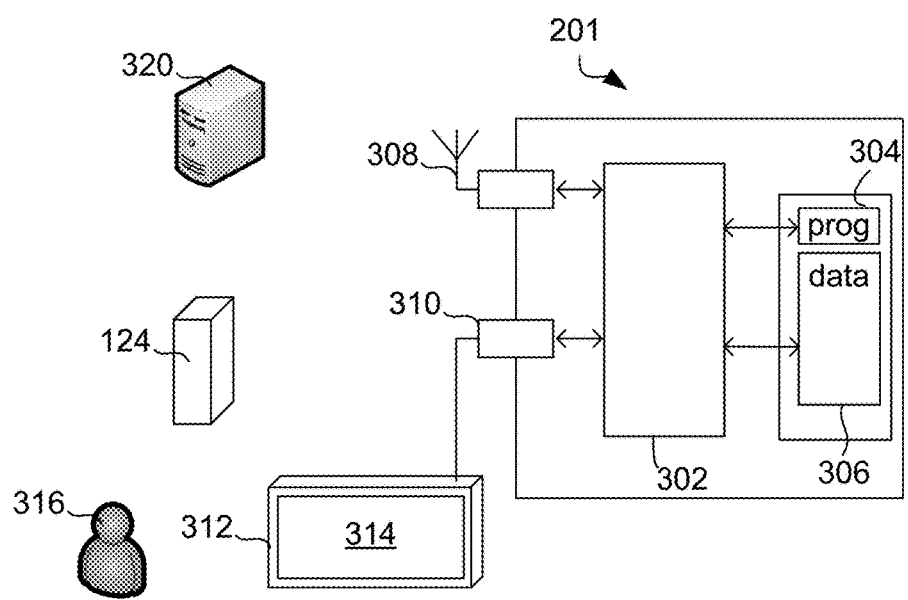

FIG. 3 illustrates the server from FIG. 2 in more detail.

Figures 4, 5:
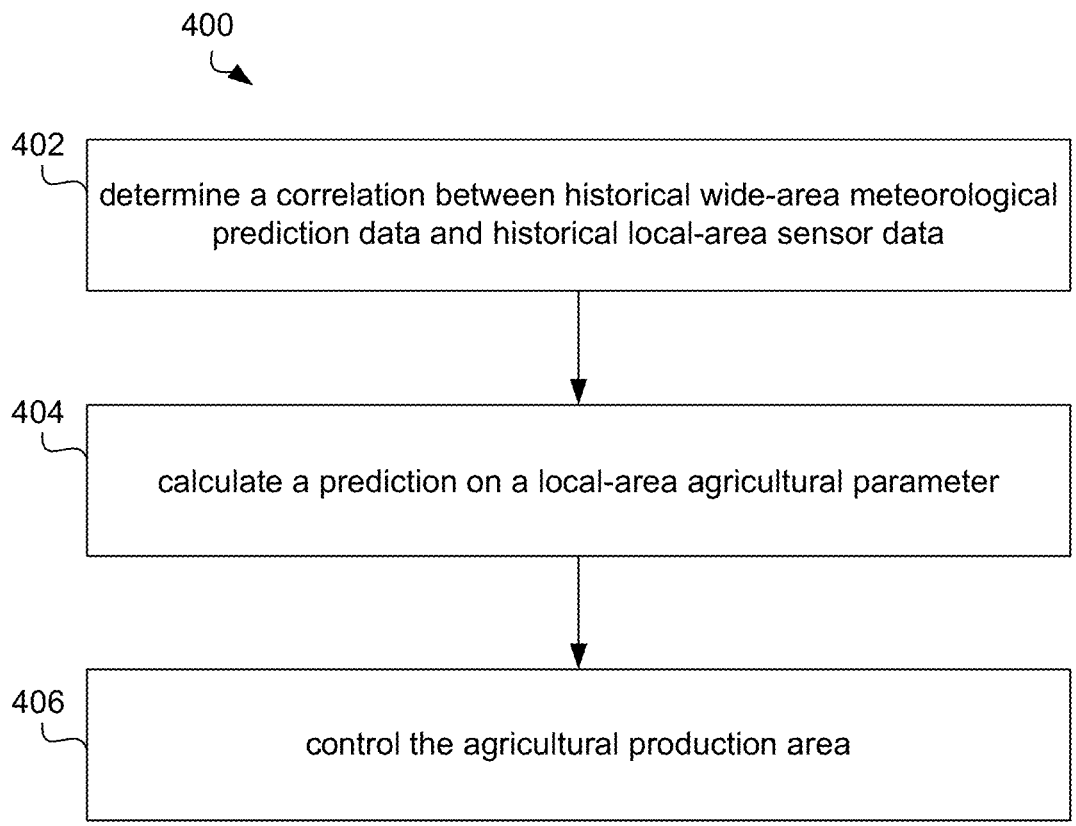

FIG. 4 illustrates a method for controlling an agricultural production area.

FIG. 5 illustrates a database of historical data.

Figure 6:
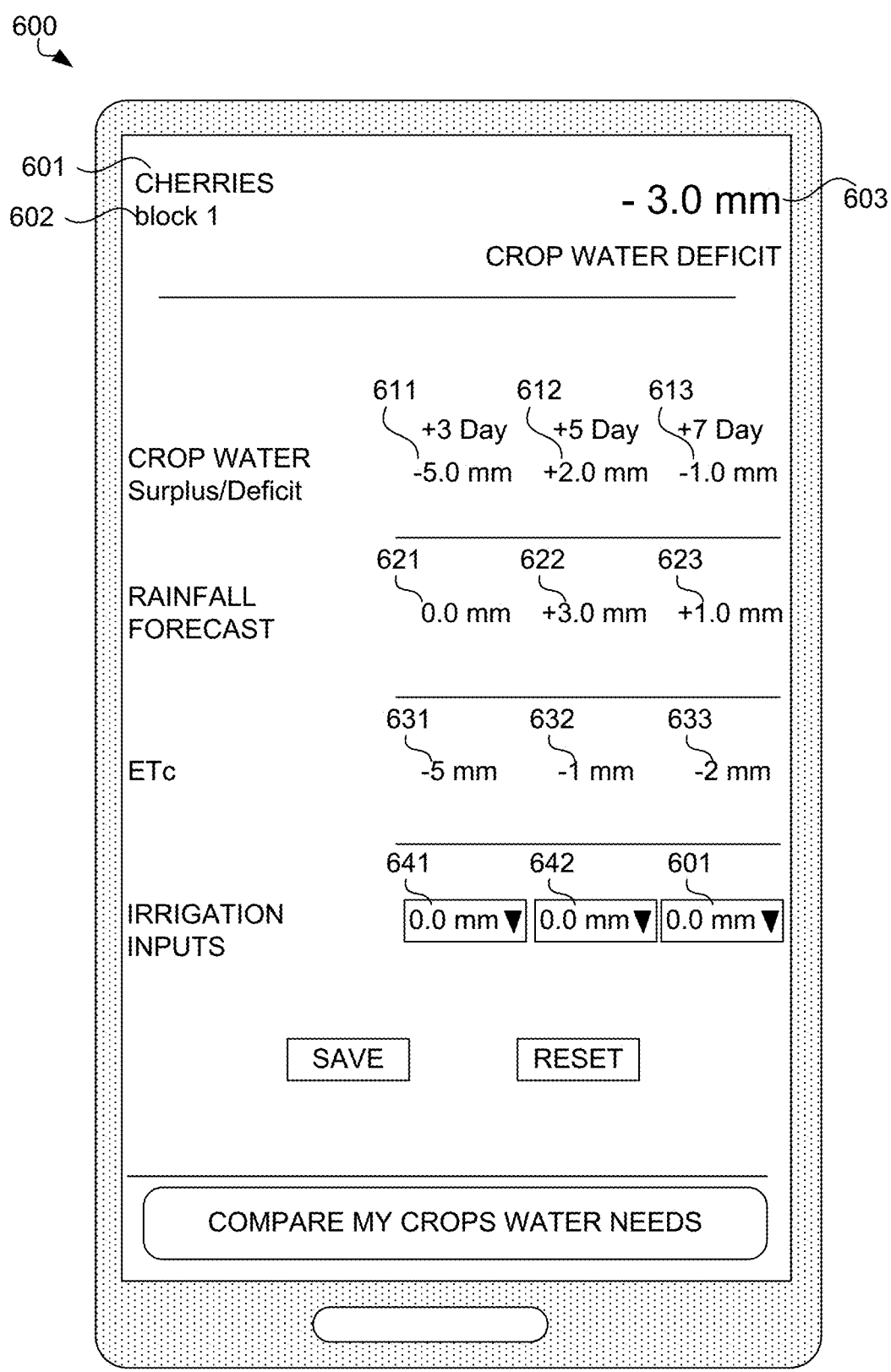

FIG. 6 illustrates an example user interface for one block.

Figure 7:
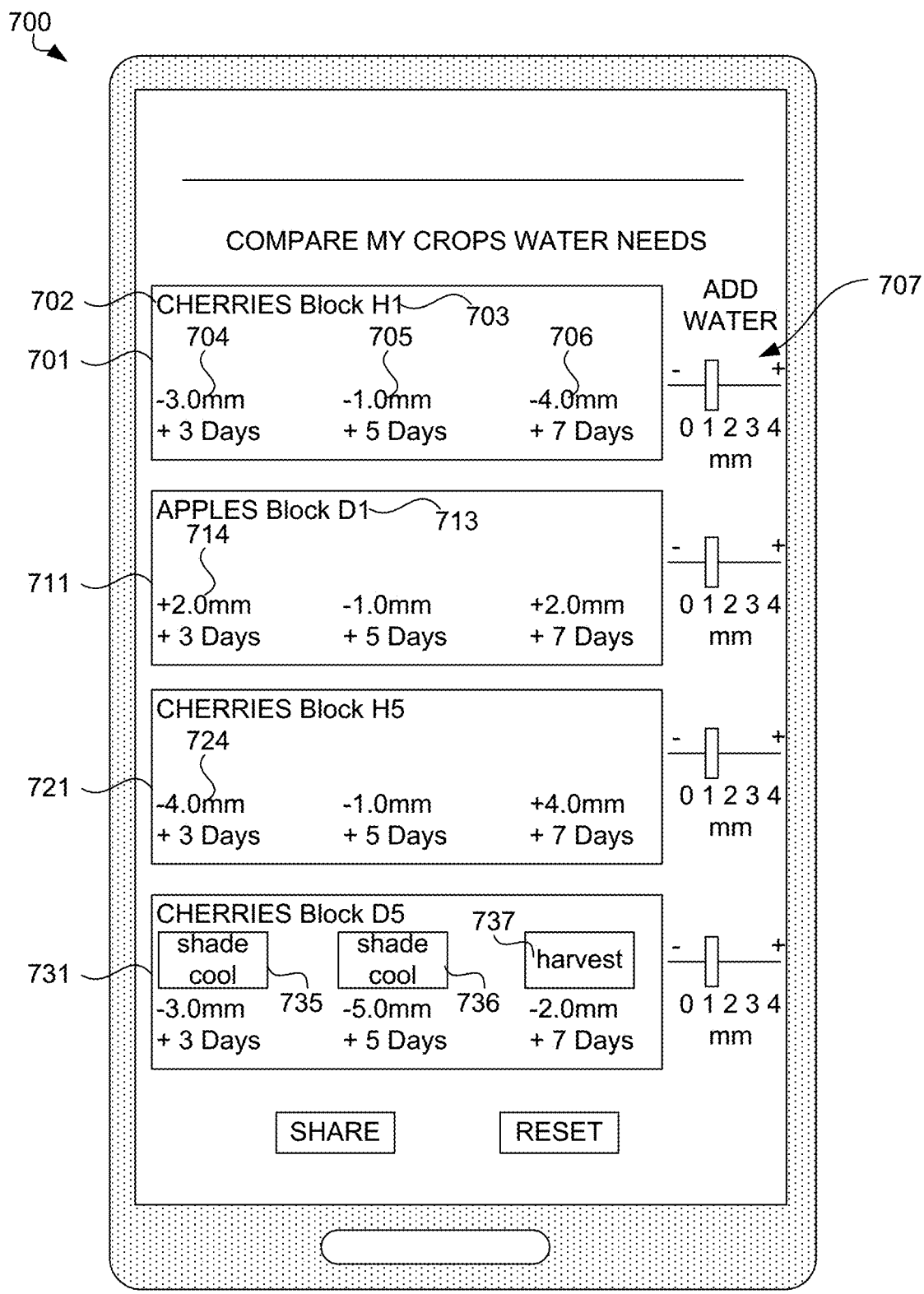

FIG. 7 illustrates an example user interface for multiple blocks.

Figure 8:
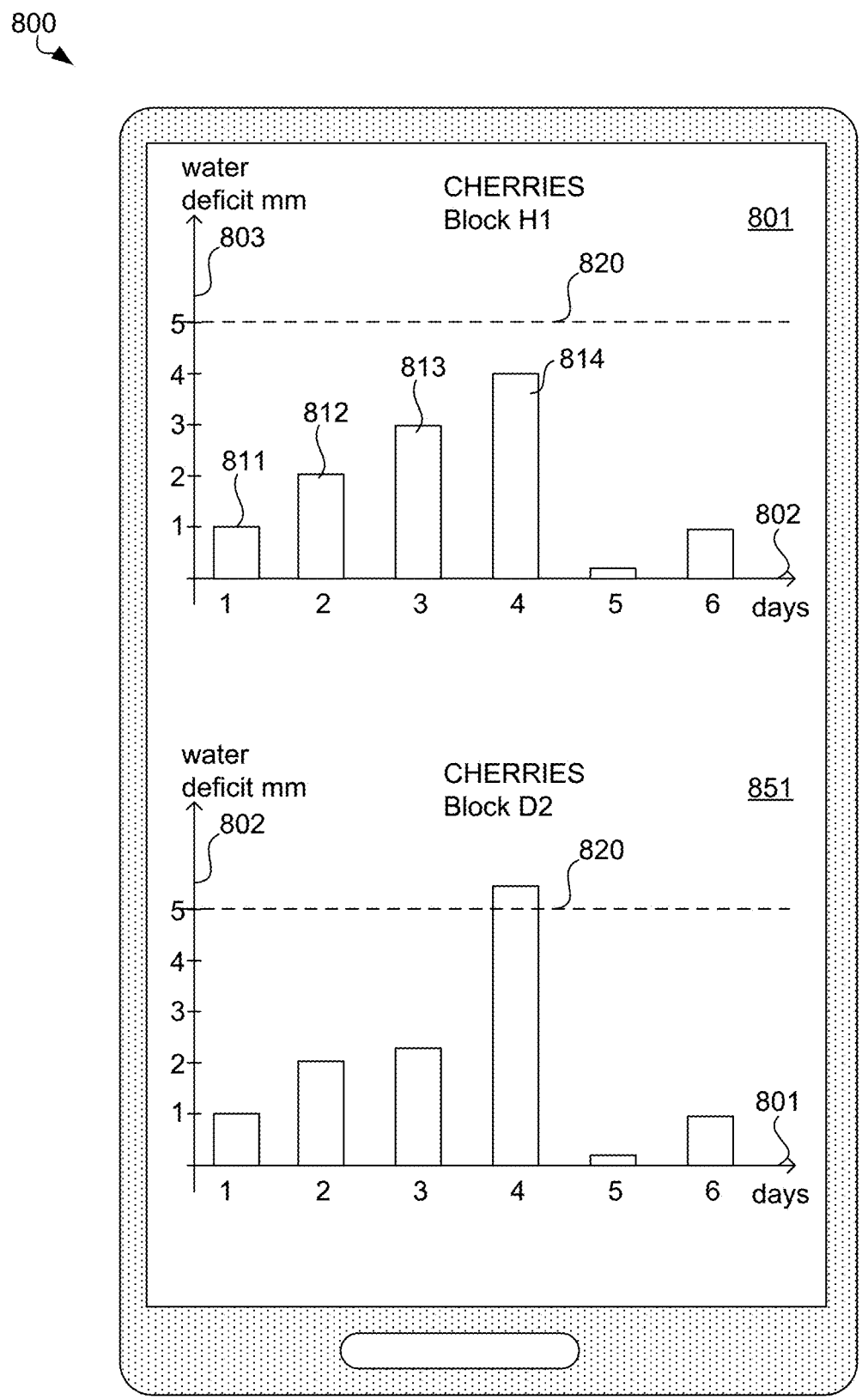

FIG. 8 illustrates a cumulative user interface.

Figure 9:
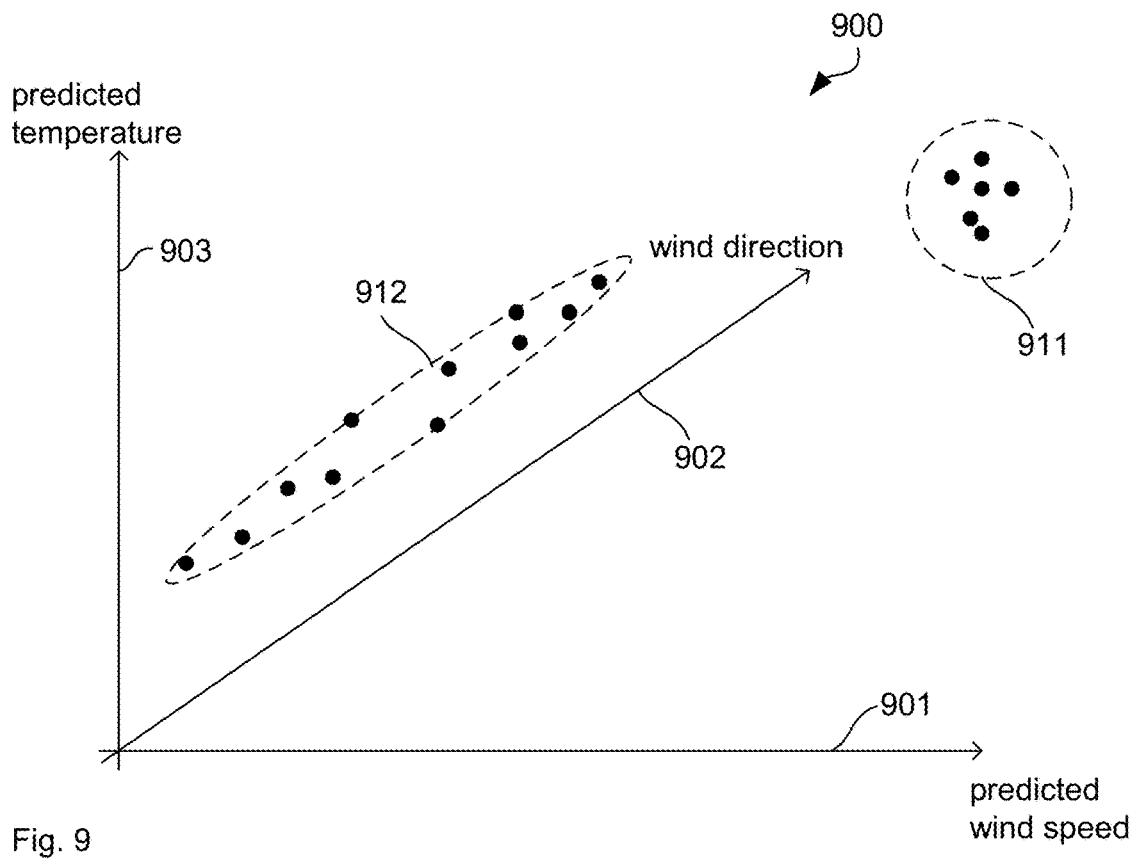

FIG. 9 illustrates a scatter plot 800 of historical wide-area meteorological prediction data.

Figure 10:
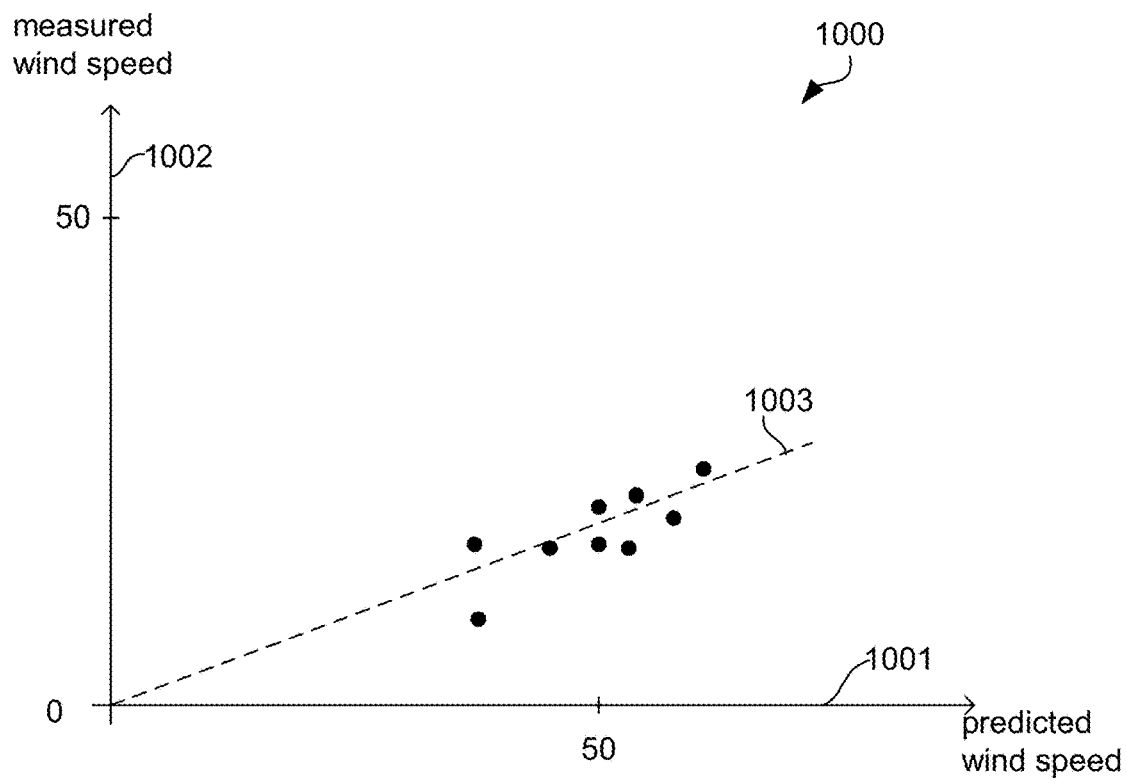

FIG. 10 illustrates a scatter plot of predicted wind against measured wind for a first synoptic condition.

FIG. 11 illustrates a correlation matrix.

DESCRIPTION OF EMBODIMENTS

This disclosure provides a more accurate prediction because the calculations proposed herein capture variations in the local area that are practically impossible to incorporate into wide-area forecasts. The disclosed method is more robust and cost efficient than modelling the characteristics of the local area, such as the wind across a given terrain. A wide variety of micro-climatic effects can be captured without complicated and error prone modelling.

Within this disclosure and unless stated otherwise, wide-area meteorological prediction data refers to data that is generated by a model with a limited spatial resolution. For example, wide-area may refer to a resolution of 10 km or more, which means that locations within a 10 km by 10 km cell have the same prediction. Wide-area meteorological prediction data may also neglect geological features, such as waterways and terrain, below a predefined threshold, such as 100 m width of waterways or 100 elevation of terrain or water bodies or relief features that have a scale less than that of the model grid, or are poorly resolved at the resolution of the model grid.

Wide-area meteorological prediction data may include data calculated by any one or more of the following models:
- GFS Global Forecast System (previously AVN)—developed by NOAA
- NOGAPS—developed by the US Navy to compare with the GFS
- GEM Global Environmental Multiscale Model—developed by the Meteorological Service of Canada (MSC)
- IFS developed by the European Centre for Medium-Range Weather Forecasts
- UM Unified Model developed by the UK Met Office
- GME developed by the German Weather Service, DWD, NWP Global model of DWD
- ARPEGE developed by the French Weather Service, Météo-France
- IGCM Intermediate General Circulation Model
- WRF The Weather Research and Forecasting model was developed cooperatively by NCEP, NCAR, and the meteorological research community. WRF has several configurations, including:
- WRF-NMM The WRF Nonhydrostatic Mesoscale Model is the primary short-term weather forecast model for the U.S., replacing the Eta model.
- WRF-ARW Advanced Research WRF developed primarily at the U.S. National Center for Atmospheric Research (NCAR)
- NAM The term North American Mesoscale model refers to whatever regional model NCEP operates over the North American domain. NCEP began using this designation system in January 2005. Between January 2005 and May 2006 the Eta model used this designation. Beginning in May 2006, NCEP began to use the WRF-NMM as the operational NAM.
- RAMS the Regional Atmospheric Modeling System developed at Colorado State University for numerical simulations of atmospheric meteorology and other environmental phenomena on scales from meters to hundreds of kilometers—now supported in the public domain
- MM5 The Fifth Generation Penn State/NCAR Mesoscale Model
- ARPS the Advanced Region Prediction System developed at the University of Oklahoma is a comprehensive multi-scale nonhydrostatic simulation and prediction system that can be used for regional-scale weather prediction up to the tornado-scale simulation and prediction. Advanced radar data assimilation for thunderstorm prediction is a key part of the system.
- HIRLAM High Resolution Limited Area Model, is developed by the European NWP research consortia HIRLAM co-funded by 10 European weather services. The meso-scale HIRLAM model is known as HARMONIE and developed in collaboration with Meteo France and ALADIN consortia.
- GEM-LAM Global Environmental Multiscale Limited Area Model, the high resolution 2.5 km (1.6 mi) GEM by the Meteorological Service of Canada (MSC)
- ALADIN The high-resolution limited-area hydrostatic and non-hydrostatic model developed and operated by several European and North African countries under the leadership of Météo-France
- COSMO The COSMO Model, formerly known as LM, aLMo or LAMI, is a limited-area non-hydrostatic model developed within the framework of the Consortium for Small-Scale Modelling (Germany, Switzerland, Italy, Greece, Poland, Romania, and Russia).
- ECMWF European Centre for Medium-Range Weather Forecasts
- ACCESS Australian Community Climate and Earth-System Simulator weather model by the Australian Bureau of Meteorology Local-area sensor data means sensor data that is collected at one particular point within the agricultural production area. This means that the area considered by the local-area sensor data is at least one magnitude smaller than the area considered by the wide-area meteorological prediction data.

Figure 1:
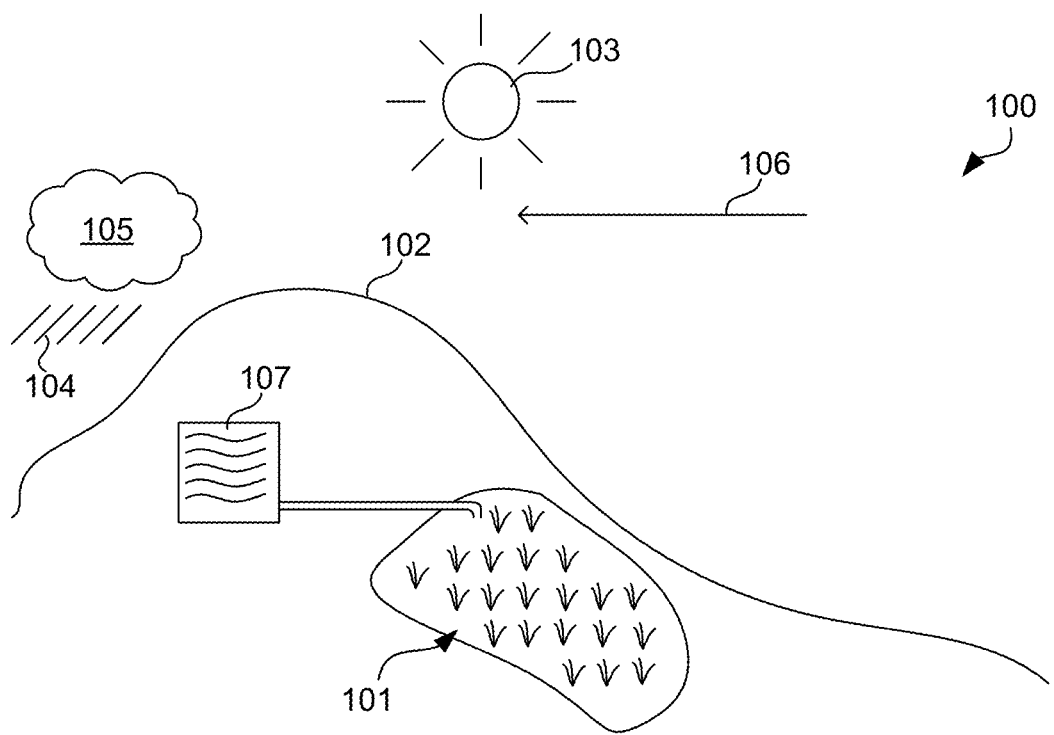
FIG. 1 illustrates an agricultural production according to the prior art.

FIG. 2 illustrates the agricultural production 100 from FIG. 1 but now with an irrigation system 200 deployed to control the irrigation of the agricultural production 100. The irrigation system 200 comprises a monitoring and control server 201 connected to an irrigation actuator 202 and to a receiver 203 for wide-area meteorological prediction data. There is also a sensor network 204 comprising multiple sensors, such as example sensor 205 deployed within an agricultural production area 206 to collect local-area sensor data. The server 201 predicts water supply relative to water demand within the agricultural production area 206 and controls the actuator 206 accordingly to compensate for any shortfall in water.

Computer System

FIG. 3 illustrates server 201 in more detail. Server 201 is a computer system that comprises a processor 302 connected to a program memory 304, a data memory 306, a communication port 308 and a user port 310. The program memory 304 is a non-transitory computer readable medium, such as a hard drive, a solid state disk or CD-ROM. Software, that is, an executable program stored on program memory 304 causes the processor 302 to perform the method in FIG. 4, that is, processor 302 collects local-area sensor data determines a correlation to wide-area meteorological prediction data, such as weather forecast data, predicts water supply relative to water demand within the agricultural production area 206 and controls the actuator 206 accordingly to compensate for any shortfall in water.

The processor 302 may store the calculated water supply relative to water demand or generate a user interface displaying the calculated water supply relative to water demand on data store 306, such as HTML code on RAM or a processor register. Processor 302 may also send the determined values and/or user interface via communication port 308 to a webserver 320 that makes the HTML code available to user 316.

The processor 302 may receive data, such as local area sensor data, wide area meteorological prediction data or user input data, from data memory 306 as well as from the communications port 308 and the user port 310, which is connected to a display 312 that shows a visual representation 314 of the user interface to a user 316. It is noted that computer system 201 may be a personal computing system, such as a personal computer, smart phone, tablet, phablet or other computing device. In those cases, processor 302 and display 312 are part of the same device. In other examples, the data is processed on a server and processor 302 generates the user interface in the form of HTML or other web-based format. In those cases, the display 312 is part of a different device, such as a personal computing device with an installed web browser or proprietary program application ('app') to render the user interface generated by processor 302.

In one example, the processor 302 receives sensor data from sensor 204 via communications port 308, such as by using a Wireless Sensor Network (WSN) according to WSN technical standards, including IEEE 802.11—WiFi, IEEE 802.15.4 supporting 6LoWPAN and ZigBee, and LoRaWAN, to support the local area networking, and using 3G/4G mobile telecommunications for backhaul to the processor 302. The WSN may be a decentralised ad-hoc network, such that no dedicated management infrastructure, such as a router, is required or a centralised network with a router or access point managing the network.

In one example, the processor 302 receives and processes the local area sensor data in real time. This means that the processor 302 generates or updates the user interface every time sensor data is received from sensor 124 and completes this calculation before the sensor 124 sends the next sensor data update. This is an advantage as the wide area rainfall data is often accumulated over 24 hours, which does not allow for an assessment of shorter time frames, such as 1 hour. In contrast, the local area sensor data from sensor 124 can be captured at rates of up to or exceeding once per minute, which allows a short-time assessment. This way, the agricultural production 100 can be controlled in a time frame of hours instead of entire days.

Although communications port 308 and user port 310 are shown as distinct entities, it is to be understood that any kind of data port may be used to receive data, such as a network connection, a memory interface, a pin of the chip package of processor 302, or logical ports, such as IP sockets or parameters of functions stored on program memory 304 and executed by processor 302. These parameters may be stored on data memory 306 and may be handled by-value or by-reference, that is, as a pointer, in the source code.

The processor 302 may receive data through all these interfaces, which includes memory access of volatile memory, such as cache or RAM, or non-volatile memory, such as an optical disk drive, hard disk drive, storage server or cloud storage. The computer system 300 may further be implemented within a cloud computing environment, such as a managed group of interconnected servers hosting a dynamic number of virtual machines.

It is to be understood that any receiving step may be preceded by the processor 302 determining or computing the data that is later received. For example, the processor 302 pre-processes sensor data and stores the processed sensor data in data memory 306, such as RAM or a processor register. The processor 302 then requests the sensor data from the data memory 306, such as by providing a read signal together with a memory address. The data memory 306 provides the data as a voltage signal on a physical bit line and the processor 302 receives the sensor data via a memory interface.

It is to be understood that throughout this disclosure unless stated otherwise, meteorological prediction, rainfall, variables, sensor data and the like refer to data structures, including any related metadata, which are physically stored on data memory 306 or processed by processor 302. Further, for the sake of brevity when reference is made to particular variable names, such as "period of time" or "rainfall" this is to be understood to refer to values of variables stored as physical data in computer system 300.

Method for Controlling an Agricultural Production

FIG. 4 illustrates a method 400 as performed by processor 302 for controlling an agricultural production area 206. FIG. 4 is to be understood as a blueprint for the software program and may be implemented step-by-step, such that each step in FIG. 4 is represented by a function in a programming language, such as C++ or Java. The resulting source code is then compiled and stored as computer executable instructions on program memory 304.

As mentioned above, processor 302 receives 402 wide-area meteorological prediction data through receiver 203 and/or data port 308. The meteorological prediction data may comprise data indicative of the predicted rainfall in mm over the next 24 hour period of time or wind speed and wind direction in 10 min intervals for the next 24 hours. Receiving the wide-area meteorological prediction data may comprise requesting the data from an web-based interface or from a data file service, via FTP, of a meteorology service provider, or may comprise scraping a website of a meteorology service provider. The data files may be XML files or other formats including axf, grb, dbf, shp, shx, csv, txt, NetCDF.

Processor 302 stores this data from the receiver over time to build a database of historical wide-area meteorological prediction data. Processor 302 may store the prediction data for the closest prediction time. For example, if there is a weather forecast available for each of the next five days, processor 302 stores the weather forecast for the following day and repeats this every day. In more detail, on 1 January processor 302 stores the weather forecast for 2 January. On 2 January processor 302 stores the weather forecast for 3 January and so on. This way, processor 302 builds a database of weather forecasts for multiple days. That is, on 31 January processor 302 has created a database of 31 entries of historical wide-area meteorological prediction data.

Similarly, processor 302 stores data from the sensor network 204 as historical local-area sensor data. In more detail, processor 302 stores the sensor data for each day. The sensor data may be an aggregate value of the measurements from sensors 205, such as day average, cumulative, maximum or minimum value. For example, rainfall may be stored as cumulative over 24 hours. Wind may be stored as an average. In the application of frost protection processor 302 may store the minimum measured temperature as the historical local-area sensor data. In one example, processor 302 stores the data from each sensor separately. In another example, processor 302 calculates an aggregate value across multiple sensors, such as an average, cumulative, maximum or minimum value of all sensors. This way, the minimum temperature measured within the entire area 206 can be stored, for example.

FIG. 5 illustrates database 500 of historical data comprising a first record 501 and a second record 502. In this example, the historical local-area sensor data and the historical wide-area meteorological prediction data are stored together in the same record. In particular, first record 501 and second record 502 each comprise data fields for predicted wind speed 503, predicted wind direction 504, predicted temperature 505, first sensor wind measurement 506, first sensor temperature measurement 507, second sensor wind measurement 508 and second sensor temperature measurement 509.

In this dataset on first day 501 the wind prediction was for 12 km/h from the East and a predicted temperature of 20 degrees Celsius. The first sensor measured significantly lower wind speeds (at 506), which may indicate that the first sensor is protected from the easterly wind. Unsurprisingly, first sensor also measures a higher than predicted temperature (at 507). In contrast, second sensor measures higher wind than forecast (at 508) and a lower temperature (at 509) which may indicate that second sensor is located in a wind funnel for easterly winds. On the second day 502 the predicted wind changed to southerly and as a result the first sensor measured higher wind speeds (at 506) and the second sensor (at 508) measured lower wind speeds (at 508) which indicates that the wind shielding of the sensors is effective for particular wind directions.

In the above example the measured values directly correspond to the predicted values, which means both the prediction and the measurements have wind speed and temperature. It is noted, however, that in other examples there is no direct correspondence. For example, the prediction may be on temperature and the measurement on soil moisture.

As can be seen above, there is a complex interrelationship between the predictions and the measurements. Returning back to FIG. 4, processor 302 determines 402 a correlation between the historical wide-area meteorological prediction data (503, 504, 505) and the historical local-area sensor data (506, 507, 508, 509) based on the historical wide-area meteorological prediction data (503, 504, 505) and the historical local-area sensor data (506, 507, 508, 509). This correlation may be embodied in a variety of forms as will be described in further detail below but may include factors of a linear regression model or a k-means clustering method.

Next, processor 302 receives current wide-area meteorological prediction data from the receiver. In this context, current prediction data relates to prediction data that is for a future point in time, that is, the prediction is current at the time of receiving the data. For example, a weather forecast for 2 January received on 1 January is current on 1 January and becomes historical on 2 January or 3 January. While these examples relate to days, other time periods for forecasting may equally be used, such as three hours. In one example, prediction relates to at least 24 hours into the future. In a further example, the historical wide-area meteorological prediction data and the historical local-area sensor data relates to at least 5 days in the past. This means 5 records in the database in the case of daily data or 5*X records for X records per day.

Processor 302 now calculates 404 a prediction on water supply relative to water demand within the agricultural production area 206 based on the current wide-area meteorological prediction data and the correlation between the historical wide-area meteorological prediction data and the historical local-area sensor data. The prediction on water supply relative to water demand may be a prediction on water deficit or water surplus. For example, the weather forecast for tomorrow is 30 degrees with 40 km/h of wind. Processor 302 can use the previously calculated correlation to predict a water deficit of 30 mm for tomorrow.

In order to calculate the predicted agricultural parameter, processor 302 may first calculate a prediction on the local-area sensor data based on the correlation and the current wide-area meteorological prediction data. Processor 302 may then use a predetermined relationship between the local-area sensor data and the agricultural parameter to calculate the prediction for the agricultural parameter. As described in more detail below, processor 302 may use an agricultural model or a trained machine learning model, such as a regression model, to calculate the agricultural parameter from the local area sensor data. While the correlation between the wide-area meteorological prediction data and the local-area sensor data is different for each sensor due to local environment variations, the relationship between the local-area sensor data and the agricultural parameter may be identical for all sensors or all users of the system. For this reason, more resources can be invested into the accurate quantification of that relationship and more data could be available for machine learning of that relationship.

Finally, processor 302 controls the irrigation actuator 202 based on the prediction on water supply relative to water demand to define an amount of water to be used for irrigating the agricultural production area. For example, to compensation for a water deficit of 30 mm, processor 302 may define a water flow of 100 l/h.

Agricultural Model

In one example, calculating the prediction on the local-area agricultural parameter in step 404 is based on an agricultural model. An agricultural model is any method of quantitatively defining an agricultural-specific output. For example, an agricultural model may be a model of foliage growth over time. When seedlings are first planted, the water loss caused by evapotranspiration is minimal but as the seedlings grow evapotranspiration will increase. This means that the water deficit increases over time for otherwise constant environmental parameters. Processor 302 considers such effects by using the agricultural model in the prediction. For example, processor 302 receives predicted wind data for the next 5 days and predicts the water deficit over the next five days considering an increased foliage evapotranspiration for each day.

In another example, the agricultural model comprises plant states. In the example of wheat crops, the states may include germination, seedling growth, tillering, stem elongation, booting, head emergence, anthesis (flowering), milk development, dough development and ripening or other states of Zadoks decimal growth scale. In the example of a cherry tree, the states may include Dormant, Swollen bud, Bud burst, Early white bud, White bud, Bloom, Petal fall and Fruit set.

The plant progresses through the states depending on the local area sensor data. In particular, the plant progresses through the states faster when there is a large amount of sunlight and progresses through the states slower when there is a small amount of sunlight. As a result, processor 302 can predict the state of the plants in the future based on the current wide-area meteorological prediction data and the correlation between the historical wide-area meteorological prediction data and the historical local-area sensor data. That is, processor 302 selects one of multiple possible states based on the predicted local-area sensor data (which is, in turn, based on the wide-area meteorological prediction data and correlations to the local-area sensor data). The values that determine the state transition may be stored on data store 306 in the form of a state transition matrix or state machine.

For example, each state may be associated with a number of sunlight hours or a value of Watts of irradiation, such as the White bud state of cherry trees may last for 30 h of local-area sunlight and then change to Bloom. As mentioned before, the local-area sunlight may differ between blocks since local conditions, such as fog or clouds over mountain ranges can significantly affect sunlight values, which is reflected in the aforementioned correlation. Using the plant states with the associated values for state transition, processor 302 can predict when the plants will be in each plant state.

In one particularly important example, processor 302 can predict based on the current weather forecast and the correlation to the historical local-area sensor data when the plant will be in bloom. The bloom state has particular characteristics or risks that may also be stored in the state transition matrix on data store 306. For example, the plant may be particularly susceptible to pests, mould or other diseases during bloom. If local-area conditions are predicted to exist while the plant is predicted to be in the bloom state, mitigation measures can be planned to avoid or reduce the negative impact from these effects. For example, when cherries are not in a bloom state they are not susceptible to frost (low frost risk). However, when they are in a bloom state (high frost risk) and frost is predicted at the local-area, netting, roofing or moisture control can be provided to reduce the effect of frost on the flowers. In other words, the prediction on the local-area agricultural parameter is a prediction on the plant state and the prediction value is 'bloom'. Controlling the agricultural production area then comprises mitigating the effect of adverse conditions, such as installing roofing or netting or controlling moisture.

The advantage is that netting and roofing and/or other mitigation measures can be planned ahead, which is important as it usually takes days to install those measures.

Updating the Model

In some examples, processor 302 performs the step 402 of determining a calculation repeatedly in order to update the correlation based on further wide-area meteorological prediction data and further local-area sensor data. In this sense the proposed system can be fully operational within a few days after deployment with a limited set of data. Over time, the dataset becomes more complete, which means the predictions become more accurate for a wider range of conditions.

Sub-Areas

In further examples, the agricultural production area 206 comprises multiple sub-areas, such as regions, farms, paddocks, rows and even individual plants. In particular for the more granular approaches, such as paddocks, rows and plants, the local-area prediction can add significant benefit as the prediction allows the control of each paddock, row or plant optimally and independently from the other sub-areas. It is noted that processor 302 performs method 400 for each of the sub-areas separately. That is, at least one sensor is located in each sub-area and processor 302 determines the correlation for each sub-area based on the sensor data from that sub-area. In most examples, the wide-area meteorological prediction data is identical for all sub-areas. In other words, processor 302 determines a first correlation between the wide-area meteorological prediction data and the historical sensor data from a first set of sensors located in a first sub-area. Processor 302 then determines a second correlation between the same wide-area meteorological prediction data and the historical sensor data from a second set of sensors located in a second sub-area and so on. This way, the correlation is specific to that particular sub-area and sensor data. In those examples, processor 302 may also control the sub-areas individually based on the calculated prediction specific to that sub-area. Sub areas may also include protected cropping areas such as greenhouses, crops under nets, or other forms of protection. For example, processor 302 may provide more water to inclined north-facing rows as they receive more intense sunlight than neighbouring rows at a different inclination. In another example, the correlation between the wide-area meteorological prediction data and historical local-area sensor data reflects how the conditions inside a greenhouse change for different weather outside, such as how the greenhouse warms up when there is sunshine outside. The resulting increase in evapotranspiration and therefore, increase in water demand can be calculated.

Examples of Control

While the above examples relate to irrigation, other means of controlling the agricultural production area can be chosen. For example, the planting of new crops can be optimised to occur at the time when particularly beneficial conditions are predicted to exist, such as particularly high soil temperature. Further, the harvesting can occur based on a growth and ripening model. That is, processor 302 can predict the irradiation by the sun over multiple days or months and therefore predict the time when the crop will be ready for harvesting. Other controls relate to the protection of crops for sub-areas that are particularly prone to hail or damaging winds, for example. Another example is in protected cropping where the crops are covered with a net or other protection mechanism, these can be controlled based on prediction data and historical local data. Further, the feeding of plants by fertilizer can be controlled based on the prediction of plant state and other weather constraints to improve the growth performance.

User Interfaces

In further examples, processor 302 also creates a graphical user interface to present the prediction on the local-area agricultural parameter to a user. FIG. 6 illustrates an example user interface 600 comprising an indication of a plant type 601 and an indication of a selected local area 602, such as a sub-area of agricultural production area 206. The values shown in FIG. 6 are calculated for this particular plant type (cherries in this example) and for this particular area ("block 1") as described above. User interface 600 comprises an indication of today's water deficit 603 as calculated based on the evapotranspiration and rainfall for today. User interface 600 further comprises indications of predicted water surplus/deficit for future 3 days 611, 5 days 612 and 7 days 613 in the future. It is noted that these values 611, 612 and 613 are calculated based on the weather forecast (i.e. the wide-area meteorological prediction data) for those future times as well as the correlation between the weather forecast and the sensor data as described above. For example, the 7 days predicted water deficit is calculated based on the weather forecast for 7 days in the future and the correlation between the weather forecast and the sensor data.

User interface 600 further comprises an indication of predicted rainfall from the weather forecast 621, 622 and 623 for 3 days, 5 days and 7 days in the future, respectively. User interface 600 also comprises and indication of the predicted evapotranspiration 631, 632, 633 for 3 days, 5 days and 7 days in the future, respectively. Controlling the agricultural production area 206 may then comprise the farmer observing the user interface 600 and instigating control accordingly. User interface 600 further provides input elements to allow the farmer to input control measures that are applied. In particular, user interface comprises inputs to provide irrigation amounts 641, 642 and 643 for 3 days, 5 days and 7 days in the future, respectively.

FIG. 7 illustrates an example user interface 700 for multiple blocks, that is, for multiple sub-areas of agricultural production area 206. The sub-areas may have different plant types planted on them, such as cherries or apples. The plant type may define the agricultural model that is used to predict the evapotranspiration over time as described above.

User interface 700 comprises multiple panels for each of multiple sub-areas, including first panel 701, second panel 711, third panel 721 and fourth panel 731. Within the first panel 701 there is an indication of the plant type 702 and a block or sub-area identifier 703. Panel 701 further comprises an indication of a predicted water deficit or surplus for the next 3 days 704, 5 days 705 and 7 days 706. As described above, the predicted water deficit or surplus is calculated based on the weather forecast for those days and the correlation between the weather forecast and the sensor data for that particular block. As can be seen in FIG. 7, the values for water deficit/surplus are different for each block which illustrates the difference in the correlation between the sensor data from that block and the weather forecast and the difference between plant models for plant types. For example, in a second panel 710 associated with a second block 713, the plant type 712 is apples and the predicted 3 day water surplus 714 is significantly different from the predicted 3 day water deficit 704 for the first block due to different plant type and different block. In third panel 721, the predicted 3 days water deficit 724 is different to the predicted 3 days water deficit 704 in the first panel 701 for the first block despite the identical plant type. This illustrates the difference in correlation between the weather forecast and the local-area sensor data for those blocks.

User interface 700 may further comprise a user input 707, such as a slider or numeric input, that allows the user to set an amount of water that is to be added for irrigation of the block. The selected amount of water may be shown in mm, which may equate to litres per square meter per day. Processor 302 may have stored on data store 306 the surface area of the sub-areas and multiply the surface area with the selected value to calculate the amount of water in litres to arrive at the selected value in mm. For example, for a water deficit of 4 mm, the user may select 4 mm irrigation to compensate for this deficit. Processor 302 may also suggest the calculated water deficit as an irrigation value. Server 201 may control actuator 202 according to the selected amount.

User interface 700 may further comprise an automatic suggestion on controlling the agricultural production area. Processor 203 determines the suggestion based on the prediction on the agricultural parameter. For example, the agricultural parameter may be the predicted plant stage of the plant under the predicted local area sensor data according to the plant model. As described herein, each plant stage has certain risks associated with it and the occurrence of the risk event depends on the local area conditions as sensed by the sensors.

For example, during fruit growth sunburn is a major risk which predominantly occurs when the temperature is high, such as over 30 degrees. In this case, processor 203 determines the fruit growth stage as an agricultural parameter and predicts high local-area temperature as described herein. As a result, processor 203 automatically determines that shading and/or cooling should reduce sunburn. Accordingly, as shown in FIG. 7, processor 203 includes into the user interface 700 a first recommendation 735 to shade and cool the fruit at +3 days, a second recommendation 736 to shade and cool the fruit at +5 days and a third recommendation 737 to harvest the fruit at +7 days. The farmer can then by following the automatic suggestion reduce the risk of sunburn significantly, which will increase the output of fruit from the production area.

Similarly, processor 203 may suggest some control measures at particular times of day. For example, processor 203 predicts that solar irradiation will decline from midday due to increasing cloud cover and therefore suggest the application Calcium foliar for the afternoon. It is to be understood that in some examples, user interface 700 may show only the suggestions 735, 736 and 737 and without the predicted data.

Quality Parameters

In one example, the prediction on the local-area agricultural parameter comprises a quality parameter that is indicative of a predicted quality of a produce from the agricultural production area. For example, the shelf life of lettuce depends on the soil moisture during the 24 hours before harvest. The soil moisture is different for different soil types. For example, sandy soil holds less water as compared to Clay or Loam. Likewise different plants need different soil moisture levels in the same type of soil to grow optimally. Therefore, the farmer can optimise the shelf life of lettuce by controlling the farm optimally in the sense that the harvest is scheduled where optimal soil moisture is predicted. This also means that user interface 600 may comprise an indication of the predicted shelf life instead of or in addition to the water surplus deficit 611, 612, 613. For example, user interfaces 600 and/or 700 may show "Medium, Low, Good" for the predicted shelf life of the produce when harvested in 3 days, 5 days and 7 days, respectively.

Processor 302 may calculate a correlation between the local-area sensor data and the quality parameter. For example, a retailer can feedback data indicating the amount of produce that is discarded each day for each batch of produce. Processor 302 can then look-up the harvest time and sub-area of that batch and label the record of the local-area sensor data from that sub-area for that harvest time with the amount of discarded produce. Processor 302 can then determine a regression or other learning method to calculate the correlation between local-area sensor data and produce quality. Based on this correlation, processor 302 can calculate a predicted quality using the predicted local-area sensor data or the predicted agricultural parameter, such as the water deficit. In other examples, the produce quality can be measured directly, such as by measuring the sugar content of grapes or by manual tastings.

Future Controls

FIG. 8 illustrates a cumulative user interface 800 comprising a first chart 801 associated with a first sub-area. First chart 801 comprises a time axis 801 and a water deficit axis 802. Time axis 801 represents the prediction times in the future and user interface 800 comprises a column for the cumulative water deficit for each day in the future. For example, a first column 811 indicates that on the first day there is a predicted water deficit of 1 mm. On the second day there is also a water deficit of 1 mm, which processor 203 adds to the water deficit 811 of the first day to calculate a cumulative water deficit of 2 mm as indicated by a second column 812. Equally on the third day and the fourth day the cumulative water deficit rises to 3 mm 813 and 4 mm 814, respectively. In some instances, a farmer would commence irrigation if it does not rain for more than two days. Using the systems and methods disclosed herein and in particular user interface 800, the farmer can see more accurately what the water deficit is predicted to be in the future. In this example, the farmer can set a threshold 820 and can see that the cumulative water deficit does not reach the threshold before a predicted rain event in 5 days. The predicted rain event reduces the predicted water deficit which means the farmer can decide not to irrigate without significant negative impact to the farm.

User interface 800 comprises a second chart 851 associated with a second sub-area. The first chart 801 and the second chart 851 show the predicted cumulative water deficit over the same time period, which means the underlying weather forecast is the same for the first sub-area and the second sub-area. However, the correlation to the local-area sensor data is different. As a result, the water deficit in the second block surpasses the threshold 820, which indicates that irrigation should be activated for the second block to improve productivity. Interestingly, irrigation may be activated for any one or more of the first, second, third or fourth day to reduce the cumulative water deficit on the fourth day. This can be of significant value in cases where the water flow for all sub-areas together is restricted to a maximum amount per day, such as a when irrigating from a river. In that case, the second block can be irrigated on the first day and a third block can be irrigated on a second day to keep the cumulative water deficits of both blocks on the fourth day below the threshold.

Decision Support Tool

As is now apparent from this description, there is a decision support tool for agriculture provided that delivers agriculture specific parameters from numerical weather prediction model output localised using bias correction factors that are developed from in-situ observations and synoptic classification. The decision support tool is delivered through the UI and UX. Agriculture specific parameters include rate of evapotranspiration (which feeds into irrigation), growing degree days (which feeds into key events in the growth cycle).

The output of the numerical weather prediction model may be a gridded model output of parameters such as 2 m air temperature, 2 m relative humidity, 10 m wind speed, solar radiation flux, etc. In-situ observations are collected by sensors measuring the same variables, or easily comparable variables at the point of interest.

Correlations

The following description provides further detail on determining the correlation between the historical wide-area meteorological prediction data and the historical local-area sensor data in order to create local area predictions. The first example illustrates a synoptic approach and the second example a machine learning approach using neural networks.

FIG. 9 illustrates a scatter plot 800 of historical wide-area meteorological prediction data comprising a wind speed axis 901, a wind direction axis 902 and a temperature axis 903. Each dot represents wide-area meteorological prediction data for one day also referred to as one data point. Processor 203 may cluster the data points resulting in a first cluster 911 and a second cluster 912, such as by performing a k-means clustering method. In other examples, processor 203 labels each data point based on the local area sensor data. For example, processor 203 assigns data points to a first cluster if the measured soil moisture is above a threshold and to a second cluster if the measured soil moisture is below the threshold. In other examples, processor 203 clusters the data points based on the local-area agricultural parameter, such as water deficit. For example, processor 203 clusters data points using a threshold of 3 mm water deficit.

Each cluster of data points may represent a synoptic condition. Synoptic in meteorology refers to general view of the weather in the region. For example, first cluster 911 represents the synoptic condition of a hot day with strong northerly winds. Second cluster 912 represents light winds from varying directions and moderate temperatures. Processor 203 may then calculate the correlation between the wide-area meteorological prediction data and the local-area sensor data for each cluster or synoptic condition separately. In one example, processor 203 develops a series of defining synoptic conditions that balance smaller number of groups, and hence large data for analysis against a larger number of groups but less data in each group for validation and analysis. This is performed using a hybrid system knowledge/machine learning approach where the initial broad classes are determined using environmental system knowledge, the expansion of these classes is evaluated using automated ML methodologies. In one example the original framework could contain 8 wind directions, 3 wind classes and a season, giving 96 discrete synoptic categories for which corrections will be determined in an ongoing and automated fashion for weather variables that are used in agricultural calculations.

Processor 203 accesses a subset of the gridded weather forecast data from the Global 0.25 degree (per cell) Forecast Model (GFS), noting this model could be replaced by any weather forecasting model. Key weather forecast parameters, such as wind direction, wind speed, relative humidity, temperature, surface solar radiation, soil moisture, etc. are used to generate a discrete synoptic situation. In one example, processor 203 takes wind speed and direction, the mean temperature over the last week and the seasonal averages to determine a synoptic situation. An example day may be a hot windy northerly condition. For this synoptic condition past records have shown that the rainfall at sensor site A is normally lower than predicted by the model. This correction has both a quantity (as a scale factor) and a degree of certainty based on the spread of the previous values. This correction is applied to the weather variable prior to an agricultural parameter being calculated. Processor 203 calculates the local weather corrections (and hence the local weather) where there are observations to build the correction matrix based on sensors (this can be a weather station within the grid).

FIG. 10 illustrates a scatter plot 1000 for the first cluster 911 comprising a first axis 1001 for the historical predicted wind speed from the meteorological prediction data and a second axis 1002 for the measured wind speed from the local-area sensor data. As can be seen from the data points, there is a strong correlation but the measured wind speed 1002 is about 0.5 times the predicted wind speed as indicated by a regression line 1003. As a result, processor 203 stores "0.5" as the correlation between the historical meteorological prediction data and the historical sensor data. The agricultural model then links the local-area wind speed to the water deficit. In this example, the influence by the remaining parameters from the meteorological prediction data, such as temperature, are insignificant and can be neglected. In other words, when the wind is strong, the water deficit does not significantly depend on the temperature. In other examples, the relationship is more complicated. For example, there may be 10 parameters measured by the local-area sensors 205 including temperature, relative humidity, wind, rain, leaf wetness, solar irradiance, photosynthetic active radiation, frost detection, soil moisture and soil temperature. Further, there may be 3 parameters predicted in the wide-area meteorological data including wind, temperature and rainfall.

FIG. 11 illustrates a correlation matrix 1100 including the multipliers, representing the correlation, for calculating the predicted local-area sensor data from the predicted meteorological prediction data. Each entry in matrix 1100 may be referred to as a bias correction factor and may be calculated from a classification matrix based on multiple model output variables that when considered together can represent different synoptic conditions that have an impact on the model calculations and their representation of localised point measurements. In one example, there is one matrix for each of multiple synoptic conditions.

In other examples, processor 302 performs a parameter selection algorithm to select the most significant parameters from the data, such as by performing a principle component analysis.

Using the second approach, the machine learning or neural network approach begins by pre-processing the data to get it in a suitable format and a suitable structure. Processor 302 then calculates correlations between different variables to determine what variables are good predictors. In one example, variables are good predictors when their absolute correlation value is higher than 0.7. The good predictor variables are then included in the model. Processor 302 then creates a list of variables from the raw data to indicate the best parameters for the model. Processor 302 determines correlations by retrieving historical wide-area meteorological prediction data and historical local-area sensor data and determining the Pearson's correlation co-efficient for each variable pair. The Pearson's correlation co-efficient is calculated using the formula:

$$\rho_{X,Y} = \frac{E[XY] - E[X]E[Y]}{\sqrt{E[X^2] - [E[X]]^2} \sqrt{E[Y^2] - [E[Y]]^2}}.$$

An initial determination of appropriate machine learning models may identify the best candidate. Processor 302 selects one or more machine learning models by evaluating initial candidates of models on scenarios and identifying the best fit based on coarse initial results.

After processor 302 selects the model with the best fit, the model can be tuned by changing the number of hidden layers and the number of nodes in each layer. In some examples, processor 302 performs a parameter selection algorithm to select the most significant parameters from the data by performing a principle component analysis to categorize the variables.

In one example, the neural network models are used to predict wind speed and direction, relative humidity, temperature, rainfall amount and rain probability, leaf wetness and soil moisture. However, other combination of parameters may be used. The tuning of the model may include:
add min max scaling to the model;
apply principle component analysis;
build the neural network by adding layers (most models have between 3 and 4 layers).

Processor 302 tests the model on a training set of data and compares the results to a test set to determine accuracy. Depending on the results, processor 302 adjusts the model by adding or removing layers and automatically adjusts the techniques used by the model such as input weights and optimisation technique.

The input data to the models is a combination of wide-area meteorological prediction data sourced from the Global Forecasting System (GFS) at a 0.25 degree grid. The data inputs taken from the GFS include weather predictions such as temperature, humidity, pressure, cloud cover (and its various forms), dew point, solar radiation, wind, rainfall rate and total rainfall, predicted sunshine duration, geopotential height at different wind levels, storm motion, surface gust, convective precipitation, freezing rain categories, ice pellet categories, snowfall and rainfall categories, ground heat flux, ice cover, Haines index, latent heat net flux, evaporation rate, sensible heat net flux, soil moisture, surface temperature, soil temperature, water run-off and wilting point. The GFS data for the last 12 months is included as the input as it provides a years' worth of seasonal variation. The second input set is actual sensor data at the location of prediction (i.e. local-area sensor data). The sensor data includes Temperature, humidity, pressure, leaf wetness, soil moisture, PAR, PYR, rain, wind speed and direction. All available sensor data can be used as an input.

To create the predictions Processor 203 evaluates the model over a portion of the historical data (i.e. between 70 and 100%) to train at a regular interval for example, once a day. This means processor 203 constantly improves the model and the system can be deployed without any prior knowledge of the local conditions. After a few days, predictions calculated by processor 203 will become more accurate than the wide-area meteorological prediction data. Processor 203 then runs the models over the new data received from the sensors and the GFS at regular intervals (for example every 2-6 hours) to create the latest predictions. The models create an hourly prediction for the next 7 days (i.e. 168 hourly points) for each variable.

The prediction models in use to predict the 8 growing variables include:

| | Input | Type | Layers/ Depth | Neurons/ Trees/C Parameter | Optimiser/ Loss Function | Kernel initialisation/ Max Features | Activation/ Order Rule |
|---|---|---|---|---|---|---|---|
| Wind Speed | Pressure, Temperature, Relative Humidity, Wind, Rainfall, Dewpoint and Solar Radiation from GFS; Wind from Sensor | Neural Network | 4 | 30; 40; 80; 168 | Adam | Normal | Relu |
| | | Random Forest | 6 | 100 | | 5 | Information Gain |
| | | Support Vector Machine | | 100 | Hinge | Radial basis function | |
| Wind Direction | Pressure, Temperature, Relative Humidity, Wind, Rainfall, Dewpoint and Solar Radiation from GFS; Wind from Sensor | Neural Network | 4 | 30; 40; 80; 168 | Adam | Normal | Sigmoid |
| | | Random Forest | 6 | 100 | | 5 | Information Gain |
| | | Support Vector Machine | | 100 | Hinge | Radial basis function | |

-continued

| Input | | Type | Layers/ Depth | Neurons/ Trees/C Parameter | Optimiser/ Loss Function | Kernel initialisation/ Max Features | Activation/ Order Rule |
|---|---|---|---|---|---|---|---|
| Rainfall | Temperature, Pressure and Relative Humidity from Sensors; Temperature, Pressure, Relative Humidity, Cloud Cover, Convective Cloud, Dew Point, Wind, Wind Gust, Heat Flux, Haines, Precipitation, U-V Storm from GFS | Neural Network | 4 | 100, 200, 300, 1 | Adam | Normal | Relu and Sigmoid |
| | | Random Forest | 4 | 50 | | 5 | Gini Index |
| | | Support Vector Machine | | 0.5 | Hinge | Polynomial | |
| Temperature | Surface Temperature from sensors and Prediction of Temperature from GFS | Neural Network | 1 | 1 | Adam | Normal | Relu |
| | | Random Forest | 1 | 10 | | 5 | Information Gain |
| | | Support Vector Machine | | 0.1 | Hinge | None | |
| Humidity | Pressure, Temperature, Relative Humidity, Wind, Rainfall, Dewpoint and Solar Radiation from GFS; Relative Humidity from Sensor | Neural Network | 4 | 20; 40; 80; 168 | Adam | Normal | Relu |
| | | Support Vector Machine | | 1000 | Hinge | Radial basis function | |
| Barometric Pressure | Pressure from GFS and sensor data | Lasso Model | 1 | N/A | N/A | N/A | Relu |
| | | Random Forest | 2 | 25 | | 12 | Gini Index |
| | | Support Vector Machine | | 10 | Hinge | Radial basis function | |
| Leaf Wetness | Leaf Wetness from Sensors - Temperature, Cloud Cover, Convective Cloud, Dew Point, TCC, Wind, Evaporation Rate, Relative Humidity, Soil Moisture, Sunshine, Haines, Pressure, Rain, Radiation Flux, Surface Temp, Heat Flux, Precipitation from GFS | Neural Network | 4 | 26; 150; 150; 1 | RMSprop | Normal | Relu |
| | | Random Forest | 6 | 100 | | 12 | Gini Index |
| | | Support Vector Machine | | 100 | Hinge | Polynomial | |
| Soil Moisture | Soil Moisture from sensors; Soil moisture and DewPoint from Forecast model(GFS) | Neural Network | 5 | For 4 layers: 1352, 60, 120, 240, 672 For 1 depth: 1352, 60, 120, 168 | Adam | Normal | Relu |
| | | Random Forest | 4 | 50 | | 2 | Gini Index |
| | | Support Vector Machine | | 10 | Hinge | Polynomial | |

In one example Leaf wetness may be predicted from a neural network that learns the correlations between the wide-area meteorological prediction data and the sensor data from the farm and is run using Processor 203. In another example Soil Moisture may be predicted using a support vector machine running on processor 203.

Sensors

In one example, the following sensor components are employed in the sense that any combination of one or more of those components constitute one sensor 205:

| Sensor | Model | Vendor |
| --- | --- | --- |
| Temperature + Relative Humidity (including radiation shield) | VP-4 | Decagon |
| Anemometer | 6410 | Davis Instruments |
| Rain Gauge | 7857M | Davis Instruments |
| Leaf Wetness | LWS | Decagon |
| Pyranometer | SP-212 | Apogee |
| Photosynthetic Active Radiation | SQ-212 | Apogee |
| Frost Detector-temperature | SF-410 | Apogee |
| Soil Moisture + Soil Temperature | GS-3 | Decagon |
| Soil Moisture + Soil Temperature | EP100DL-4 | EnviroPro |

Example

One example is an agricultural production area operated by an apple grower. The produced apples should meet specific and challenging standards—75 mm, 175 g, 90% blush, 14.5% sugar and just the right pressure. The more apples that meet this spec, the higher the profit of the apple grower. On a 50 tonne per hectare crop, the profit can be doubled with a 10% increase in packout—the % of apples that are not rejected—Packout is a direct measurement of overall quality.

The apple season starts with bud burst and the trees should have accumulated enough winter chill such that fruit set can occur—800 chill hours may be a target. The first task is to regulate fruit set. If there are too many flowers that set fruit, the then the apples will be too small—if there are not enough they will too big. So thinners need to be applied to the crop in exactly the right set of weather conditions—balancing heat units, sunlight hours, soil moisture and product selection. The methods and systems disclosed above can automatically suggest the use of thinners as a control of the production area to the farmer via the user interface. The proposed methods and systems monitor temperature trends during the day and at night. This automated solution avoids mistakes which may lead to having to send in crews to hand thin excessively, which could lose the entire profit for the year. Equally, if the flowers are over thinned at the beginning, there will be little to no crop.

At the same time blossom is occurring, and a major concern is disease and pest outbreaks as well as managing shoot growth and root growth. For example, one day at 15 C with more than six hours of leaf wetness and black spot is a risk. If a coddling moth outbreak is detected there is a window of 110 degree days (every hour over 10 C) before the grub comes out. Then there is a choice of when to respond and with which product and to which part of the orchard. Different products work in different conditions and have vastly different costs. A mistake here can diminish the 10% increase in packout. The systems and methods disclosed herein can predict the parameters at the local area and therefore automatically suggest the most appropriate product as a control of the agricultural production area. This reduces the risk to the farmer of losing profit.

The next stage is cell division. This 4 week period sees all the apples cells put down—ultimately determining the fruit's size potential. The apple's firmness is decided here too, if the right amount of water and calcium is applied, to the right part of the tree, in the correct form, the foundations of crisp fruit have been laid. Calcium foliar has to be applied thoroughly though—sprayed in the heat of the day may reduce packout by 5%—rejected with fruit burn. Fertiliser also should be kept up at the same time. Again, the systems and methods disclosed herein can predict the parameters at the local area and therefore automatically suggest the most appropriate application regime as a control of the agricultural production area and display the suggestion on the user interface.

A further risk at this stage is mite outbreak which is devastating for the colour target. Further, hail, birds and wind can cause damage. As harvest approaches there may be more time required to achieve the size target as ETo has been high this year and sizing challenging. But irrigation may not be a solution because the fruit could become soft and be sensitive to bruising. If the fruit is left on the tree too long it might get sunburnt (which is the second biggest reason for rejection after bruising in Australia) or worst still, picking may be too late, which severely compromises storage potential and shelf life. Again, the systems and methods disclosed herein can predict the parameters at the local area and therefore automatically suggest the most appropriate timing as a control of the agricultural production area.

Every step of the way the farmer makes critical decisions under time pressure. The methods and systems described herein give growers the tools to make confident decisions every step of the way—reducing uncertainty and reducing risk.

While examples herein relate to controlling agricultural production areas, the systems and methods disclosed herein may equally be applicable to other operations, including, but not limited to aquaculture, mining, natural resources, environmental monitoring, logistics, insurance and finance, building and construction and health In this sense, there is provided a method for controlling an operation in an operational area. The method comprises determining a correlation between historical wide-area meteorological prediction data and historical local-area sensor data based on historical wide-area meteorological prediction data and historical local-area sensor data. The method further comprises calculating a prediction on a local-area operational parameter based on current wide-area meteorological prediction data, and the correlation between the historical wide-area meteorological prediction data and the historical local-area sensor data. The method also comprises controlling the operation based on the prediction on the operational parameter.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A method for controlling an area, the method comprising:
   determining a relationship between historical wide-area meteorological gridded prediction data and historical local-area sensor data at a sensor location based on historical wide-area meteorological gridded prediction data for multiple meteorological variables made at a first point in time for a second point in time and historical local-area sensor data captured at the second point in time at the sensor location, the sensor data comprising multiple sensor data variables and the relationship being determined for each of the multiple sensor data variables;
   calculating at a present point in time a prediction on a local-area parameter for a future point in time based on
      present wide-area meteorological gridded prediction data for the future point in time, and
      the relationship for each sensor data variable between the historical wide-area meteorological gridded prediction data and the historical local-area sensor data for that sensor data variable at the sensor location; and
   controlling the area based on the prediction on the parameter; and
   repeatedly updating the relationship over time based on further wide-area meteorological gridded prediction data and further local-area sensor data at the sensor location to thereby improve the relationship.

2. The method of claim 1, wherein the prediction relates to at least 24 hours into the future.

3. The method of claim 1, wherein the historical wide-area meteorological gridded prediction data and the historical local-area sensor data at a point relates to at least 5 previous days.

4. The method of claim 1, wherein the historical wide-area meteorological gridded prediction data and the present wide-area meteorological gridded prediction data comprise wind data and determining the relationship and calculating the prediction is based on the wind data.

5. The method of claim 1, wherein
   the area comprises multiple sub-areas,
   there is at least one local-area sensor in each of the multiple sub-areas, and
   determining the relationship and calculating the prediction is performed for each of the sub-areas.

6. The method of claim 1, wherein controlling the area comprises one or more of:
   plant;
   irrigate;
   harvest;
   protect; and
   feed.

7. The method of claim 1, further comprising creating a graphical user interface to present the prediction on the local-area parameter to a user, wherein the method comprises repeating the step of calculating the prediction for multiple future times and creating the graphical user interface to present a time series of the prediction for the multiple future times.

8. The method of claim 7, wherein the graphical user interface comprises input elements to allow the user to input planned controlling actions.

9. The method of claim 1, further comprising determining a suggestion for controlling the area based on the prediction on the parameter.

10. The method of claim 9, further comprising determining a prediction on the local area sensor data based on the current wide-area meteorological gridded prediction data and the relationship between the historical wide-area meteorological gridded prediction data and the historical local-area sensor data at a point, wherein determining the suggestion is based on a predefined risk associated with local area sensor data where that risk is likely to occur and the suggestion is determined based on the prediction on the local area sensor data to reduce the risk.

11. The method of claim 9, further comprising displaying the suggestion in a user interface.

12. The method of claim 1, wherein the local-area parameter is a water deficit or water surplus.

13. The method of claim 1 wherein the prediction on the local-area parameter comprises a quality parameter indicative of a predicted quality of a produce from the area and controlling the area comprises optimising the quality parameter.

14. The method of claim 13, further comprising repeating the step of calculating the prediction on the quality parameter for multiple future times and creating a graphical user interface to present a time series of the prediction on the quality parameter for the multiple future times.

15. The method of claim 13, wherein the quality parameter comprises an expected shelf life.

16. A non-transitory computer readable medium with computer code stored thereon, when executed by a computer, causes the computer to perform a method comprising:
   determining a relationship between historical wide-area meteorological gridded prediction data and historical local-area sensor data at a sensor location based on historical wide-area meteorological gridded prediction data for multiple meteorological variables made at a first point in time for a second point in time and historical local-area sensor data captured at the second point in time at the sensor location, the sensor data comprising multiple sensor data variables and the relationship being determined for each of the multiple sensor data variables;
   calculating at a present point in time a prediction on a local-area parameter for a future point in time based on
      present wide-area meteorological gridded prediction data for the future point in time, and
      the relationship for each sensor data variable between the historical wide-area meteorological gridded prediction data and the historical local-area sensor data for that sensor data variable at the sensor location; and controlling the area based on the prediction on the parameter; and repeatedly updating the relationship over time based on further wide-area meteorological gridded prediction data and further local-area sensor data at the sensor location to thereby improve the relationship.

17. A computer system for controlling an area comprising:
a receiver for receiving wide-area meteorological gridded prediction data for multiple meteorological variables and local area sensor data comprising multiple sensor data variables;
a processor to:
  determine for each sensor data variable a relationship between historical wide-area meteorological gridded prediction data and historical local-area sensor data at a sensor location based on the historical wide-area meteorological gridded prediction data made at a first point in time for a second point in time and the historical local-area sensor data for that sensor data variable captured at the second point in time at the sensor location;
  calculate at a present point in time a prediction on a local-area parameter for a future point in time based on
    present wide-area meteorological gridded prediction data for the future point in time, and
    the relationship for each sensor data variable between the historical wide-area meteorological prediction data and the historical local-area sensor data for that sensor data variable at the sensor location;
  repeatedly update the relationship over time based on further wide-area meteorological gridded prediction data and further local-area sensor data at the sensor location to thereby improve the relationship; and
an output port to control the area based on the prediction on the parameter.

* * * * *